United States Patent [19]
Stern

[11] 3,741,632
[45] June 26, 1973

[54] ANTIGLARE MIRROR WITH ONE REFLECTING FACE FORMED OF AN ARRAY OF PRISMS

[75] Inventor: David Stern, Windsor, Berkshire, England

[73] Assignee: Combined Optical Industries, Limited, Slough, Buckinghamshire, England

[22] Filed: Jan. 12, 1971

[21] Appl. No.: 105,900

[30] Foreign Application Priority Data
Jan. 23, 1970   Great Britain...................... 3,435/70

[52] U.S. Cl.................. 350/281, 350/211, 350/292
[51] Int. Cl............................ B60r 1/04, G02b 5/08
[58] Field of Search.................... 350/279–281, 286, 204, 211, 292

[56] References Cited
UNITED STATES PATENTS

| | | | |
|---|---|---|---|
| 3,561,848 | 2/1971 | Cunningham | 350/281 |
| 2,953,062 | 9/1960 | Ford | 350/286 |
| 3,254,556 | 6/1966 | Staunton | 350/168 |
| 3,293,982 | 12/1966 | Appeldorn | 350/211 UX |

*Primary Examiner*—John K. Corbin
*Attorney*—Shoemaker & Mattare

[57] ABSTRACT

A method of making a mirror in which a body is moulded of transparent synthetic plastics material, the body having a plain face and a face equispaced therefrom and including linear prisms integral therewith, the prisms together forming a surface which will reflect incident light received from one direction in a common direction different from that in which the plain surface will reflect that incident light and with a reflective power different from that of the plain surface.

7 Claims, 3 Drawing Figures

PATENTED JUN 26 1973　　　　　　　　　　3,741,632

INVENTOR
DAVID STERN
BY
Shoemaker and Mattare
ATTORNEYS

ANTIGLARE MIRROR WITH ONE REFLECTING FACE FORMED OF AN ARRAY OF PRISMS

This invention is concerned with improvements in and relating to mirrors and methods of making mirrors.

It is known to provide rear view mirrors for motor vehicles which have a front reflective surface and a rear reflective surface at an angle to the front reflective surface, the surfaces having different reflective characteristics so that with the mirror in one attitude the driver may obtain a reflection in day time from one surface of a first intensity and with the mirror in another attitude he will obtain a reflection of a lower intensity of strong light, such as headlights of a following vehicle.

Such mirrors have been manufactured of glass, as have the conventional planar mirrors, because of the low cost of glass. However the production of glass pieces with non-parallel surfaces requires machining of individual pieces.

According to the present invention there is provided a rear view mirror comprising a moulding of transparent synthetic plastic material having one plain reflective surface with a low reflective power and another reflective surface spaced generally equidistant therefrom and having a high reflective power, that other surface having integral therewith linear prisms which together will reflect light incident from one direction in a common direction, different from that in which the plain surface will reflect such incident light, the reflective power of the plain surface and the prisms being different to give a mirror of variable reflective power.

The plain surface may be planar or curved and the surface formed of linear prisms preferably is silvered with any suitable metal. Where the plain surface is curved whether in one or two dimensions the prisms will follow the contours of the or each curvature of the plain surface.

In order that the invention may be well understood there will now be described an embodiment thereof, given by way of example only, reference being had to the accompanying drawing in which.

Figure 1:
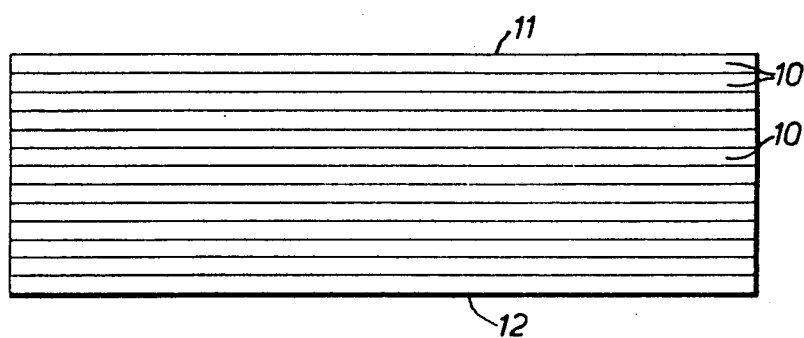
FIG. 1 is a rear view of a day and night mirror for use in a motor vehicle.
Figure 2:
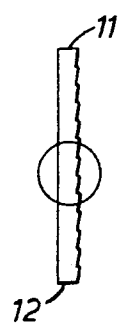
FIG. 2 is an end view of the mirror shown in FIG. 1 with the thickness illustrated on an exaggerated scale.

As shown in FIG. 1 a generally rectangular mirror, for arrangement as the rear view mirror of a motor vehicle, has a plain surface and a second surface equi-spaced therefrom and including an array of linear prisms extending there across. The linear prisms are here designated 10, and their disposition on the rear surface of the mirror can be seen in FIG. 2.

Figure 3:
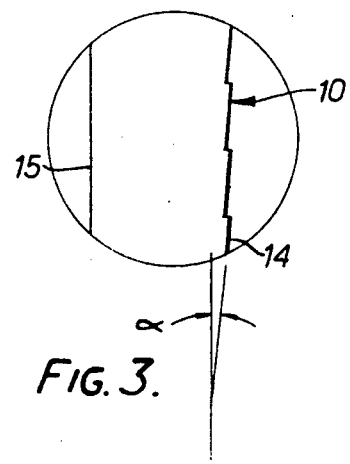
FIG. 3 is a detail of part of FIG. 2.

The actual shape of the prisms is best seen in FIG. 3 which shows that for a planar mirror mounted near the top of the windscreen of a motor car, there is in practice only a small angle alpha of the order of 3¼° between the reflective surface 14, of the linear prisms, and a plane parallel with the plain surface 15 of the mirror. This angle may however be as high as 10° for other applications. It is preferred that the outstanding angle of the prisms should be 90° and that there should be 10 to 20 prisms to the inch.

In use the mirror may be installed in a day and night mirror arrangement, for a motor car, wherein the angle of the mirror may be altered so that incident light from behind the car is reflected either from the plain frontal surface at night, or from the further surface having the array of prisms during day time use. The plain surface will have a reflective power of the order of 5 percent to 45 percent and the prismatic surface a reflective power of the order of 55 percent or better. These figures being dependent on various factors such as materials used and local legislation. It will be understood that the mounting of the mirror has an arrangement whereby the angle of the mirror may be altered relative to the position of the driver.

The mirror as described is made by moulding transparent synthetic plastics material preferably methacrylate such as DIAKON or PLEXIGLASS. A mould is used which has the linear prisms formation established therein by any of the usual mould making techniques. The frontal surface may be coated with an abrasion resistant layer lacquer while the surface having an array of prisms is silvered, preferably by vacuum deposition of aluminum, and constitutes the side of the mirror which will be remote from the incident light. Thus any dust accumulating on the inset angles of the prisms will not effect the use of the mirror.

The mirror and its method of manufacture described above by way of example has the advantage that the overall thickness of the mirror does not vary between the top and bottom surfaces 11 and 12 respectively. This permits accurate moulding, gives good optical qualities to the mirror and enables mirrors to be made from a single moulding all of which will be of the same dimensions, whereas previously known mirrors with divergent surfaces could only be formed in multiples and then cut if the units were end to end. Because of the wedge shape two units could not be formed one above another because the top of one would be thicker than the bottom of the one above. The mirror may be moulded as a planar mirror or as a mirror curved in one or two directions, in the latter cases the prisms follow the contour or contours of the front surface. A day and night mirror is provided which is much cheaper due to the moulding technique, than any thing obtainable with similar optical qualities from glass.

I claim:

1. An antiglare rear view mirror comprising a moulding of transparent synthetic plastics material having a plain reflective surface which reflects light incident thereon from one direction in a first direction and having a low reflective power, a second reflective surface thereon spaced generally equidistant from the first reflective surface, said second reflective surface having integral therewith linear prisms which together reflect light incident from said one direction in a second direction different from that in which the plain surface reflects such incident light and having a high reflective power, the different reflective powers of the plain surface and of the prisms obtaining a reflection in daytime of a first intensity from the prisms, and a reflection in nighttime of a lower intensity from the plain surface to reduce the glare of headlights and the like.

2. An antiglare mirror according to claim 1, in which the synthetic plastics material is a methacrylate.

3. An antiglare mirror according to claim 1, in which the prism surface carries a reflective metallic coating.

4. An antiglare mirror according to claim 1, in which the prism reflective surfaces are at an angle of 3¼° to 10°.

5. An antiglare mirror according to claim 1, in which there are between 10 and 20 prisms to the inch.

6. An antiglare mirror according to claim 1, in which the plain surface has a reflective power between 5 percent to 45 percent and the prisms have a reflective power of at least 55 percent.

7. An antiglare mirror according to claim 1, in which the plain surface is curved in at least one direction and the prisms follow the curvature of the plain surface.

* * * * *